(12) United States Patent
Battista

(10) Patent No.: US 7,903,494 B2
(45) Date of Patent: Mar. 8, 2011

(54) WIRELESS SENSOR INTERFACE WITH MOBILE TERMINAL SATELLITE MODEM AND GLOBAL LOCATION SYSTEM

(75) Inventor: Rich Battista, Ashburn, VA (US)

(73) Assignee: SkyBitz, Inc., Sterling, VA (US)

( * ) Notice: Subject to any disclaimer, the term of this patent is extended or adjusted under 35 U.S.C. 154(b) by 151 days.

(21) Appl. No.: 12/333,048

(22) Filed: Dec. 11, 2008

(65) Prior Publication Data

US 2009/0096604 A1    Apr. 16, 2009

Related U.S. Application Data

(63) Continuation of application No. 11/518,520, filed on Sep. 11, 2006, now Pat. No. 7,468,927.

(60) Provisional application No. 60/715,596, filed on Sep. 12, 2005, provisional application No. 60/721,540, filed on Sep. 29, 2005.

(51) Int. Cl.
    *G11C 5/14* (2006.01)
(52) U.S. Cl. ............ 365/226; 365/189.17; 365/229; 365/233.1; 365/233.15
(58) Field of Classification Search ........... 365/226, 365/189.17, 229, 233.1, 233.15
    See application file for complete search history.

(56) References Cited

U.S. PATENT DOCUMENTS 6,725,158 B1   4/2004  Sullivan et al.
7,020,701 B1 * 3/2006  Gelvin et al. .......... 709/224

\* cited by examiner

*Primary Examiner* — Thong Q Le
(74) *Attorney, Agent, or Firm* — Duane S. Kobayashi

(57) ABSTRACT

A system and method for implementing a low-power local-area wireless network for use with a mobile terminal satellite modem. This low-power local-area wireless network enables sensors on an asset to wirelessly transmit sensor data to a mobile terminal affixed on the asset. The mobile terminal reports the sensor data along with asset position information to a centralized facility via a communications satellite.

20 Claims, 5 Drawing Sheets

WIRELESS SENSOR INTERFACE WITH MOBILE TERMINAL SATELLITE MODEM AND GLOBAL LOCATION SYSTEM

This application is a continuation of U.S. Pat. No. 7,468,927, issued Dec. 23, 2008, which claims priority to provisional application No. 60/715,596, filed Sep. 12, 2005, and provisional application No. 60/721,540, filed Sep. 29, 2005. The above-identified applications are each incorporated herein by reference in its entirety.

BACKGROUND

1. Field of the Invention

The present invention relates generally to asset tracking and monitoring and, more particularly, to a wireless sensor interface with mobile terminal satellite modem and global location system.

2. Introduction

Tracking mobile assets represents a growing enterprise as companies seek increased visibility into the status of a service fleet (e.g., long-haul delivery fleet). Visibility into the status of a service fleet can be gained through mobile terminals that are affixed to service vehicles. These mobile terminals can be designed to generate position information that can be used to update status reports that are provided to customer representatives.

In providing status reports to a centralized facility, the mobile terminal can generate position information through the reception of satellite position signals such as that generated by the GPS satellite network. Generated status reports are transmitted to the centralized facility using a return link via a communications satellite.

In various embodiments, the status reports can also include sensor data that is generated by sensors affixed to the service vehicle (e.g., inside a trailer). This sensor data would enable the company to discern the condition of cargo being transported, the condition of the service vehicle, the occurrence of any events at the service vehicle, etc.

Sensor data can be obtained using sensors that are positioned at various points on a service vehicle. Connection of this collection of sensors to the mobile terminal can represent a substantial expense. Accordingly, what is needed is a mechanism that reduces the costs of obtaining such sensor data, while also minimizing the overall power required by the monitoring system.

SUMMARY

A wireless sensor interface with mobile terminal satellite modem and global location system, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
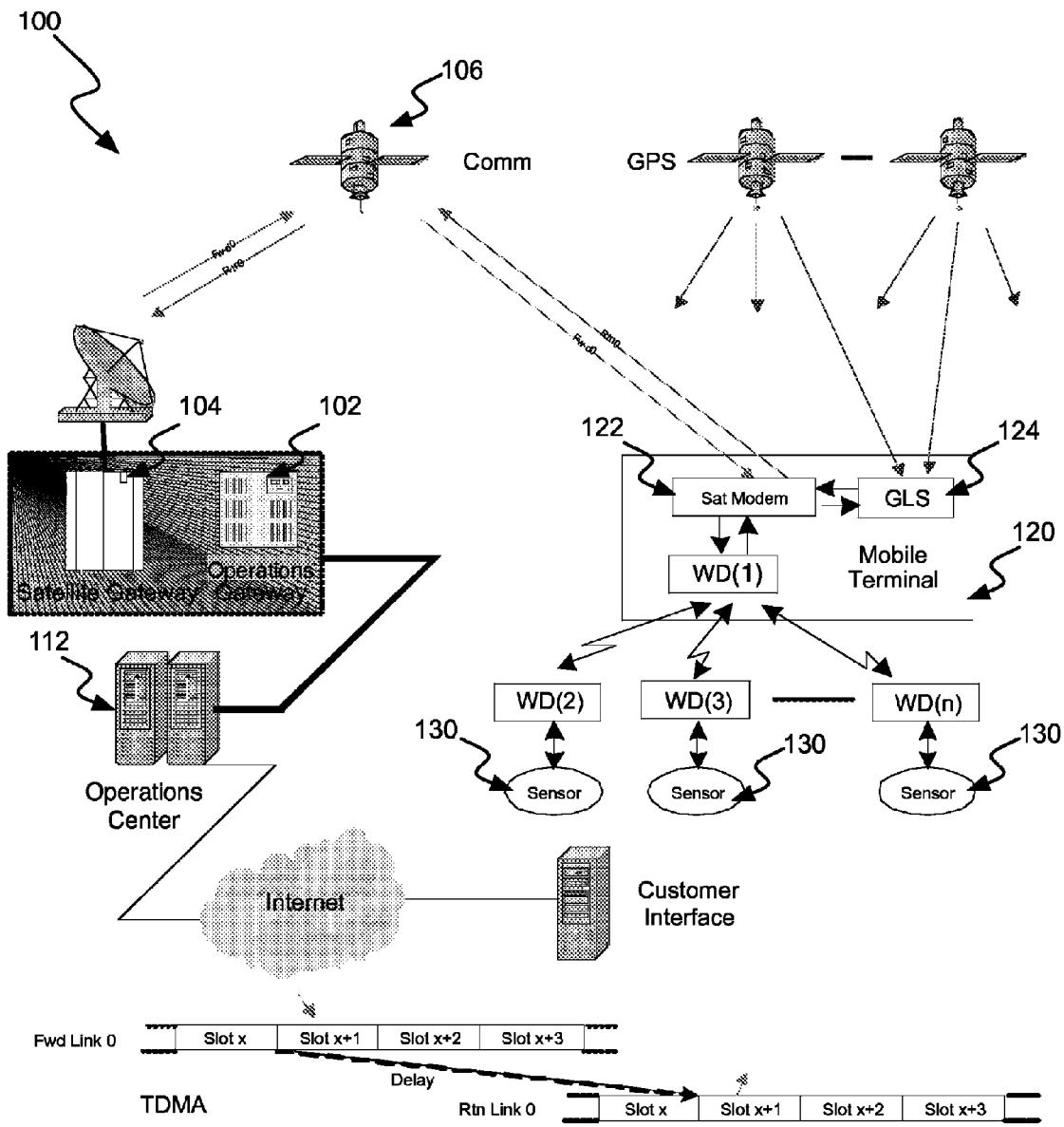
FIG. 1 illustrates an embodiment of a satellite communications network that enables the monitoring of remote assets using a collection of sensors.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Conventional asset tracking systems have been used to track the positions of assets. This position information can be relayed via satellite to a centralized facility that is responsible for reporting the current and historical positions of those assets. In meeting the demand by customers for greater visibility into the status of the assets, the asset-tracking system can also include one or more sensors that are affixed to those assets. Various sensor types can be used. For example, volume sensors, temperature sensors, chemical sensors, radiation sensors, weight sensors, light sensors, water sensors, etc. can be used to report the condition of cargo being transported. In another example, truck cab ID indicators, odometer sensors, wheel sensors, vibration sensors, etc. can be used to report the condition of the service vehicle. In general, these various sensors can be used to report status information or the occurrence of any events at the service vehicle.

Mounting one or more sensors within a trailer is especially valuable when considering the cargo that is being transported. These sensors can provide valuable information relating to the existence, condition of, and access to such cargo. For this reason, significant efforts have been made to capture and report sensor data to a centralized facility.

To enable the reporting of sensor data along with position information, sensors need an interface to a mobile terminal that reports the position and sensor information via wireless communication (e.g., satellite communication) to a centralized facility. The interface between the sensors and the mobile terminal represents a significant technical and economic challenge.

Consider, for example, an implementation where the mobile terminal is mounted on the roof of a trailer. In this implementation, the mobile terminal could require extensive connections to sensors that can be positioned at various points on the cab/trailer (e.g., on the trailer door, inside the trailer, on the wheels, in the cab, etc.). As would be appreciated, cable connections between this mobile terminal and the various sensors can add a substantial expense (e.g., hundreds of dollars) to the overall cost of deployment.

The cable connections can also represent technical challenges. For example, cable connections between a roof-mounted mobile terminal and a sensor located inside the trailer would require that one or more holes be cut into the trailer compartment. While these holes would facilitate the passage of sensor cabling into the trailer compartment, the holes would also raise significant weatherproofing issues. Moreover, the holes could also raise insulation issues when considering refrigerated trailer compartments. In another example, cable connections between a roof-mounted mobile terminal and a sensor located in the cab would require additional cabling or integration within existing cabling such as the cab-trailer electrical interface.

As these examples illustrate, implementing connections between a mobile terminal and one or more sensors affixed to the tracked asset can result in significant cost and/or development issues. The principles of the present invention are designed to meet these needs by not only implementing a wireless connection between a mobile terminal and one or more sensors that facilitates two-way communication, but also operating such a wireless network in manner that minimizes the power required the mobile terminal and sensor devices.

Prior to describing the details of the principles of the present invention, a description of an embodiment of an operational context is first provided. FIG. 1 illustrates an embodiment of a satellite network 100 that includes operations gateway 102, communicating with mobile terminal 120 on an asset. Communication between operations gateway 102 and mobile terminal 120 is facilitated by satellite gateway 104 at the ground station and satellite modem 122 in mobile terminal 120. Both satellite gateway 104 and satellite modem 122 facilitate communication using one forward and one return link (frequency) over communications satellite 106.

In one embodiment, the satellite communication is implemented in a time division multiple access (TDMA) structure, which consists of 57600 time slots each day, per frequency or link, where each slot is 1.5 seconds long. On the forward link, operations gateway 102 sends a message or packet to mobile terminal 120 on one of the 1.5 second slots. Upon receipt of this message or packet, mobile terminal 120 would then perform a GPS collection (e.g., code phase measurements) using Global Locating System (GLS) module 124 or to perform sensor measurements and transmit the data back to operations gateway 102 on the return link, on the same slot, delayed by a fixed time defined by the network. In one embodiment, the fixed delay defines a length of time that enables mobile terminal 120 to decode the forward packet, perform the data collection and processing, and build and transmit the return packet.

In one embodiment, mobile terminal 120 can be configured to produce periodic status reports. In this configuration, mobile terminal 120 would wake up periodically, search for its assigned forward slot, perform data collection and processing, and transmit the status report on the assigned return slot. In another embodiment, mobile terminal 120 can be configured to produce a status report upon an occurrence of an event (e.g., door opening, motion detected, sensor reading, etc.). In this configuration, mobile terminal 120 would wake up upon occurrence of an event, search for an available forward slot, perform data collection and processing, and transmit the status report on the return slot corresponding to the identified available forward slot.

Upon receipt of a status report from mobile terminal 120, operations gateway 102 passes the information to operations center 112, where the information is processed and passed to a customer via the Internet. A detailed description of this communications process is provided in U.S. Pat. No. 6,725,158, entitled "System and Method for Fast Acquisition Position Reporting Using Communication Satellite Range Measurement," which is incorporated herein by reference in its entirety. As would be appreciated, the principles of the present invention can also be applied to other satellite communications systems as well as to terrestrial communications systems.

As FIG. 1 further illustrates, mobile terminal 120 can also collect sensor measurements from sensors 130 that are positioned at various points on the asset being tracked. Transmission of sensor information from sensors 130 to mobile terminal 120 is facilitated by a low-power, low-cost wireless interface. As illustrated the wireless interface uses wireless device WD(1) that is coupled to satellite modem 122, and wireless devices WD(2)-WD(n) that are coupled to respective sensors 130. The wireless network formed by wireless devices WD(1)-WD(n) enables mobile terminal 120 to interface to the plurality of wireless sensors 130. It should be noted that this wireless network can operate independently from the standard functions of mobile terminal 120.

In one embodiment, wireless device WD(1) is integrated on the same hardware as satellite modem 122. In an alternative embodiment, wireless device WD(1) is on separate hardware from satellite modem 122 and uses a hardwired interface such as a serial communications interface.

Figure 2:
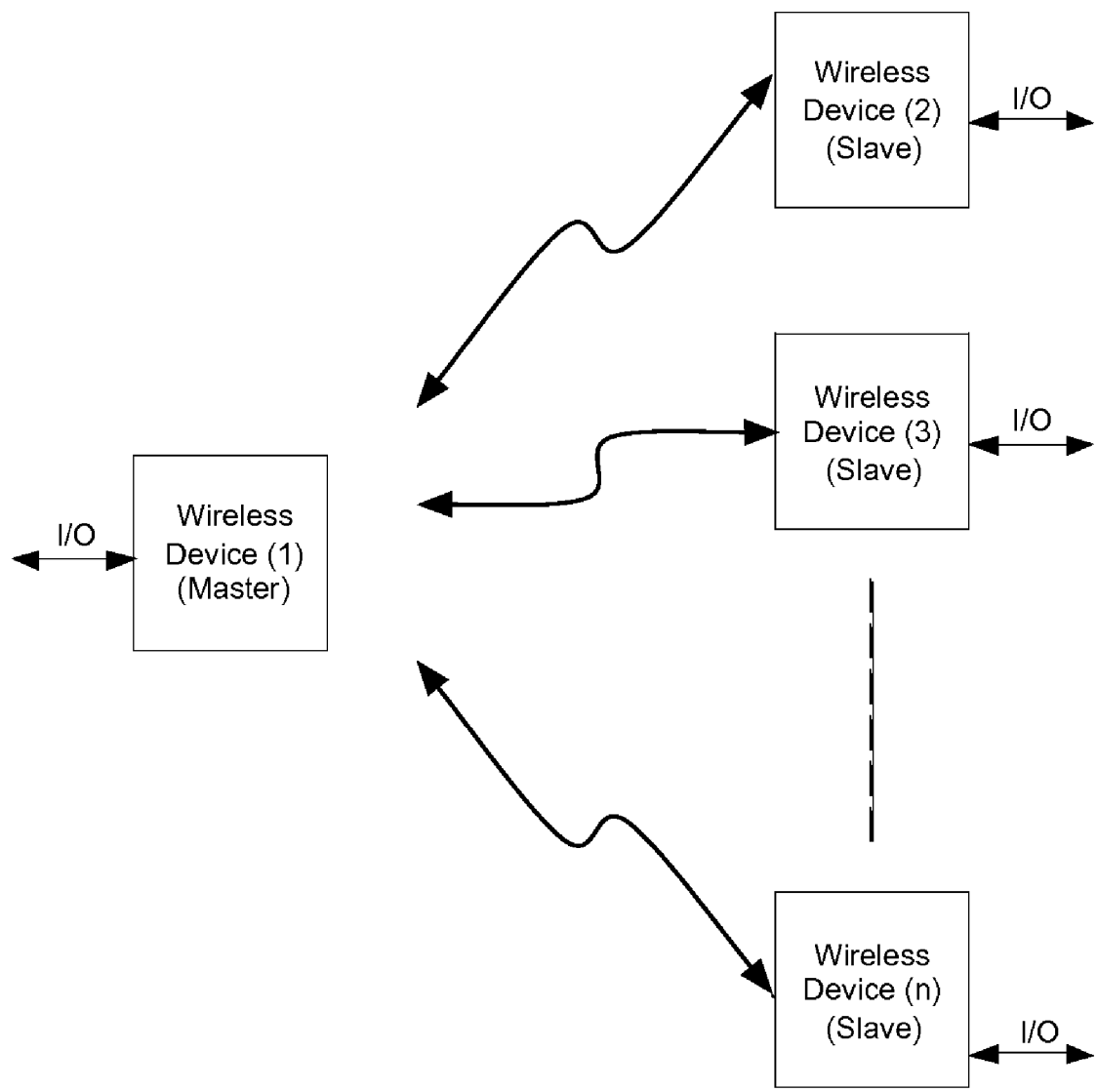
FIG. 2 illustrates an embodiment of a wireless local area network.

In one embodiment, the wireless interface uses wireless devices that can be configured as master or slave devices. FIG. 2 illustrates an embodiment of a master-slave configuration for the wireless devices. As illustrated, wireless device WD(1) in mobile terminal 120 is configured as a master device, while wireless devices WD(2)-WD(n) that are coupled to individual sensors are configured as slave devices. This master-slave configuration enables independent communication between the wireless devices.

Each wireless device can be an independently addressable unit having its own processor, power management, sleep timers and other apparatus that allows it to perform low data rate communications, conserve power and reduce cost. It is a feature of the present invention that this wireless interface has the capability to transfer binary data in both directions to and from a sensor device. In one embodiment, slave devices only transmit in acknowledgment from a request from a master device. This type of half-duplex communication exhibits good performance in low data rate systems and for avoiding collisions.

Figure 3:
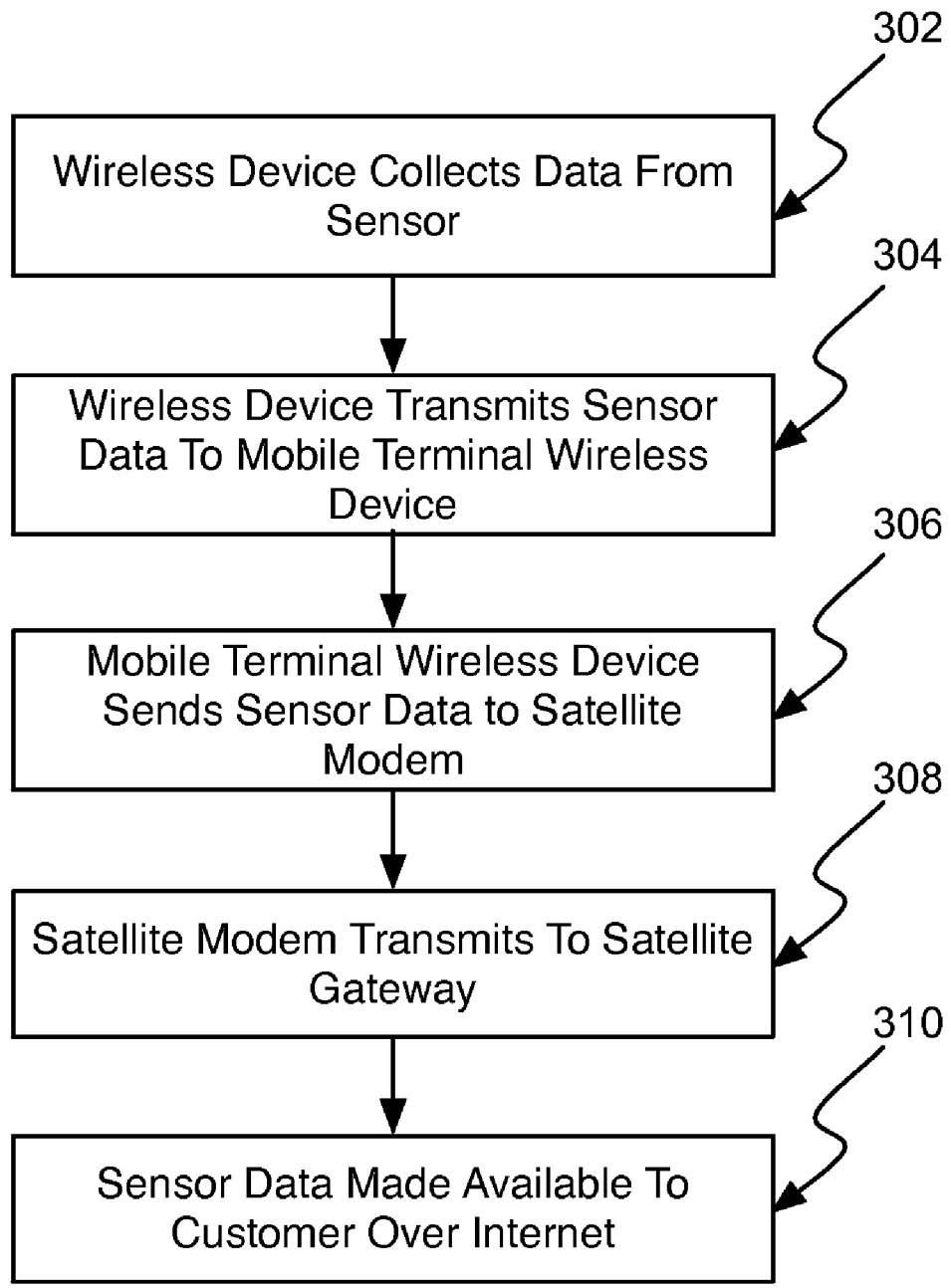
FIG. 3 illustrates a flowchart of a process of reporting sensor data to a centralized facility.

FIG. 3 illustrates a flowchart of communication between a sensor and the customer interface. As illustrated, the process begins at step 302, where a wireless device (e.g., slave wireless device WD(2)) collects data from an attached sensor 130. In one embodiment, this data collection is facilitated by a hardwired interface, such as a serial interface. In an alternative embodiment, the sensor is integrated with the wireless device.

After the sensor data is collected by the wireless device, at step 304, the wireless device then transmits the sensor data to the mobile terminal wireless device (e.g., master wireless device WD(1)). At step 306, the mobile terminal wireless device then forwards the information to satellite modem 122. At step 308, satellite modem 122 transmits the information to satellite gateway 104 via satellite 106. From here, at step 310, the sensor data can then be made available to the customer over a customer interface via the Internet.

As noted, it is a feature of the present invention that data can also be sent to the sensor device. For example, a customer can send data to a sensor device from the web interface in the opposite direction of that described in the process of FIG. 3. This direction of communication to the sensor device enables the customer or system operator to configure the sensor device through a wireless interface. In this context, device configuration can include, but is not limited to, its operating mode (such as master or slave device), baud rate, power level, channel selection, wake up interval, status requests, etc. In general, all of the wireless interface network's configurable parameters can be set or changed either over-the-air from the gateway, or through some other interface, such as a wired interface using a configuration terminal.

In addition to enabling bidirectional communications to and from a sensor device, it is a feature of the present invention that the local area wireless interface can enable system devices to be in a low power sleep mode most of the time, and only transmit for a short duration of time on a specified frequency or channel to conserve power. In one embodiment, the local area wireless interface uses a TDMA type communication protocol.

Figure 4:
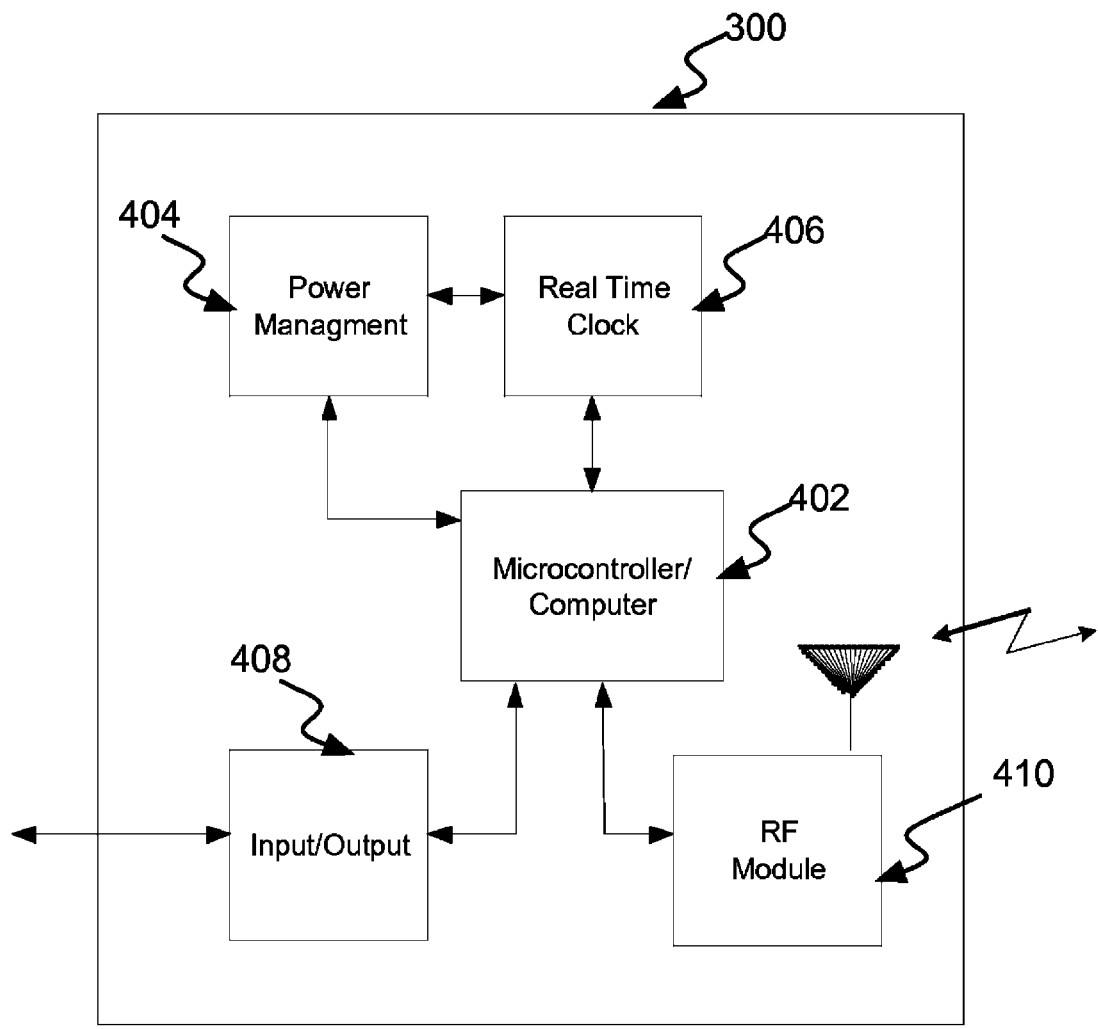
FIG. 4 illustrates an embodiment of a wireless device that is coupled to a sensor.

FIG. 4 illustrates an embodiment of a wireless device that has the ability to enter a low power state, and wake at a programmed time. As illustrated, wireless device 400 includes microprocessor 402, which is used to control the various functions, power management 404, which is used to power down and enter a low power state, real time clock 406, which wakes or powers-up the unit at a pre-determined time, input/output 408, which allows an interface to other devices, sensors, transducers, including the mobile terminal, and RF module 410, which performs the actual wireless communications. RF module 410 can be simple or complex. In one embodiment, RF module 410 would include a computer, a low-layer waveform and modulation technique, and its own protocol that could detect and correct errors and perform retries in order to reliably transmit and receive data.

Figure 5:
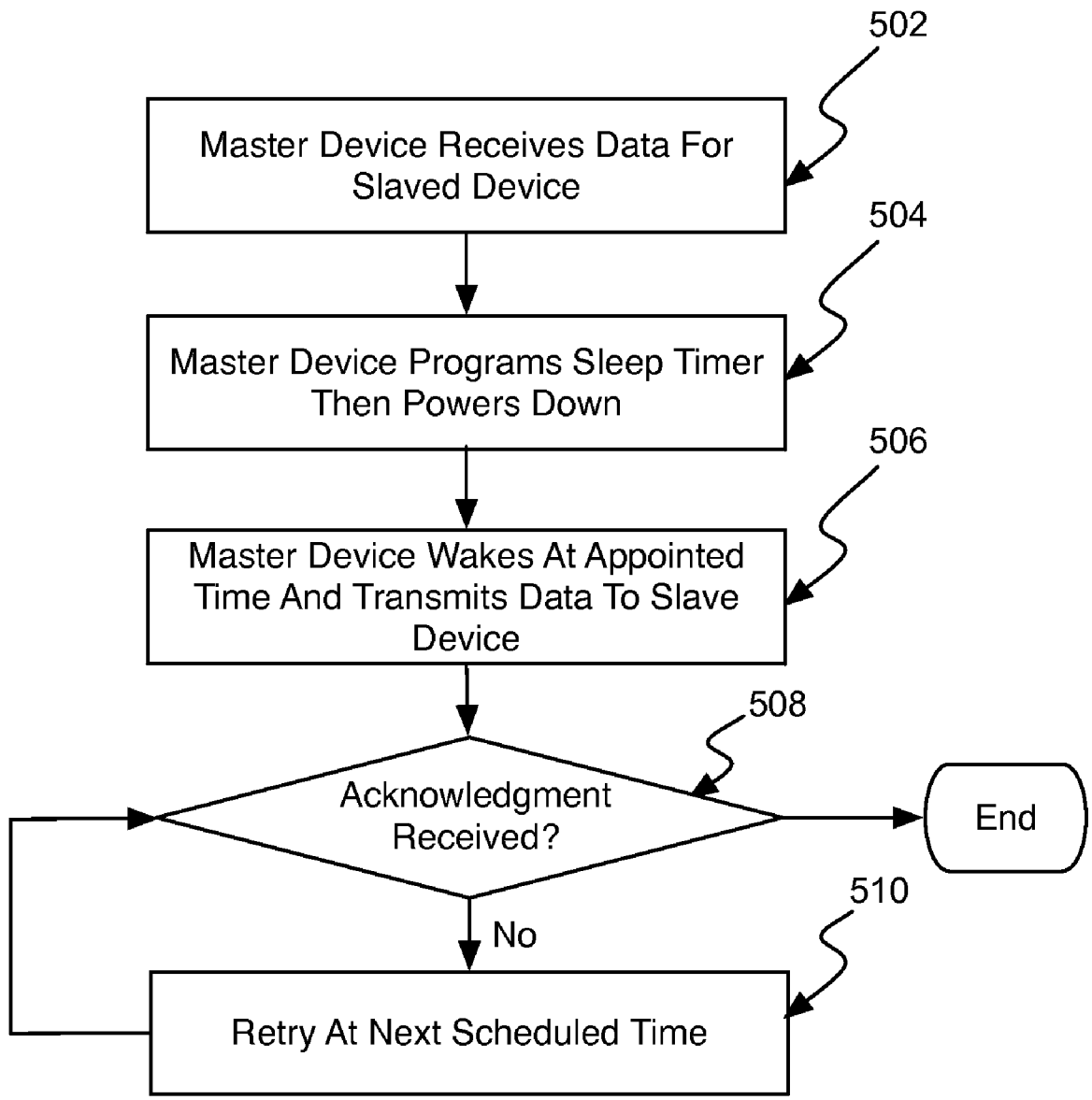
FIG. 5 illustrates a flowchart of a process of communication method that conserves power.

Having described an embodiment of a wireless device, an example of a data transfer over the low-power local-area wireless network is now provided with reference to the flowchart of FIG. 5. As illustrated, the process begins at step 502 where master device (e.g., WD(1)) is awakened and receives data from its I/O port for a particular slave device (e.g., WD(2)) and a sensor 130 that is attached to that slave device. The master device prepares this information for delivery and stores it. At step 504, the master device then programs a sleep timer to wake at the correct time then powers down. This wake time is the time the master device and the network protocol expects the receiving slave device to wake, assuming it is synchronized to the network. The master device can also compensate for time drifts and other physical layer issues.

At step 506, the master unit awakens at the scheduled time and transmits the information to the slave device. At step 508, the master device then determines whether an acknowledgment is received. In one embodiment, the slave device responds immediately. In another embodiment, both the master and slave device go back into a sleep mode and wake shortly thereafter for the slave device to send the acknowledgement.

If it is determined, at step 508, that the acknowledgment is not received, then the protocol would instruct both master and slave devices to try again at a later prescribed time, or wait for the next scheduled wakeup interval, depending on it configuration. If it is determined, at step 508, that the acknowledgment is received, then the data transfer process ends and the slave device would deliver the data to its attached sensor through its I/O port.

In one example, this process can be used to transmit configuration information to a sensor device. In another example, this process can be used to transmit a status request to a sensor device, wherein the sensor device's response would include measurement data taken by the sensor. This example illustrates an example of scheduled reporting through polling of the sensor device.

Event reporting can also be supported by the network protocol. Here, a sensor event can represent a detected change in monitored status (e.g., door opening, emptying of cargo, change in temperature, etc.), a detected change in operating state, or any other change detectable by a sensor. Information reflective of this detected event can then be prepared for transmission to the master device by the slave device, wherein the slave device sleeps until a scheduled time for transmission to the master device.

As described, the network protocol would enable the master and slave devices to sleep until a scheduled time when communication between the pair of devices on a known channel or frequency is expected to occur. This scheduled time would support a short communication between the two devices, which would ensure that the devices are only awakened for a minimal amount of time. The remaining time, which represents the vast majority of time, would be spent in a low power sleep mode.

In the description above, it is assumed that the network is synchronized such that the wake-up times are known by the individual devices. If the network is not synchronized, or the wake-up times are different, and/or channels or frequencies are different, the network protocol would enter a synchronization mode. In one embodiment, the synchronization process has all devices wake at some pseudo-random interval and channel until they find each other. The data transmitted would be small in order to minimize time and power consumption, while maximizing the probability of a hit or detection. Also, devices can be designed to slow themselves down or backoff after a period of time when it determines it is past the time where it normally synchronizes. This conserves power especially if the device has failed.

The synchronization process can also be expedited given some known information about the other devices that can or should be on the network such as their ID or group number. This information can be used in the network protocol, and in the synchronization process, particularly in the pseudo-random wake-up portion to increase the likelihood of a hit on both time and frequency. For example, this information can be used to force all devices onto the same channel or frequency, which eliminates the need to search the other frequencies, and reduces the synchronization time. This information can also be pre-programmed into each device during installation. Also, other information can be added at the factory, such as initializing the real time clocks such that the algorithm can pick times and frequencies based on the day to increase the probability of a hit, and reduce synchronization time. Synchronization can be further expedited by extraneous events such as manually pushing a button at approximately the same time on all devices on the network to initiate a momentary high rate of retries on the network. This type of event can cause all devices to use one pre-determined frequency and have each device remain powered continuously for a short duration, enough to allow all devices to enter this state and synchronize. While this mode consumes more power, it only needs to be in this mode for a short time since all the devices know that the others are also in this mode and awake.

Once a network is synchronized, the master and the network protocol can assign each device to a particular channel or frequency and wakeup time or slot. It can also broadcast additional information after the initial synchronization which will help each device more quickly synchronize in the future if it loses it's synchronization. The process that maintains synchronization can also use dithering to vary the wakeup times and frequencies on each wakeup in order to avoid collisions with other networks that may be within the same RF range.

Each individual network can also be designed to communicate to a global master device to send and receive broadcast information. An example of a global master device could be a hand-held diagnostic tool that acts as a master device except that it doesn't sleep and can continuously broadcast out to all devices since it has no power constraints. By continuously broadcasting, such a device can quickly reach all the devices in any network within RF range by waiting until their next wake up, where they can receive the broadcast information. When a device wakes on its scheduled time, which is completely different and random from devices on other networks, it can receive the broadcast information. This information would instruct the devices on what to do. One example is to command all devices to report their presence and status. The protocol can support this type of broadcast by allowing acknowledgements and retries. This way a hand held device can be used, for example, in a trucking yard to detect all networks within the yard to do an inventory. It can also be used to reprogram or reconfigure networks. This function of the network protocol allows devices to operate in different modes in order to perform maintenance, diagnostics, and operations.

As would be appreciated, various network protocols can be designed to operate the low-power local-area wireless network of the present invention. While the network protocol details can vary depending on the implementation, the network protocol is designed to satisfy a variety of functions other than the basic communication between master and slave devices. Some of the functions supported can include transferring data to and from a specific device, communicating scheduled and event data, auto detection of devices, configuring and reading status of devices, allowing diagnostic tools to use the network for configuration and re-programming, error handling, retrying failed communications, detecting collisions or interference from other low-power local-area wireless network, re-synchronizing timing of the devices, and automatically changing channels or frequencies.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A wireless sensor monitoring system at an asset location, comprising:
   a satellite modem;
   a first wireless device that interfaces with said satellite modem for delivery of sensor data to a remote location; and
   a second wireless device that is coupled to a sensor, said second wireless device being configured to receive data from said sensor, said second wireless device being configured to enter into a low power state and awaken at a scheduled time at which said first wireless device also wakes from a low power state.

2. The system of claim 1, wherein said first wireless device is configured as a master device and said second wireless device is configured as a slave device.

3. The system of claim 2, wherein said first wireless device assigns a communication channel and wakeup time to said slave device after said slave device completes a synchronization process.

4. The system of claim 1, wherein said first wireless device wirelessly transmits configuration information to said second wireless device.

5. The system of claim 4, wherein said configuration information originates at a remote location and is received by said first wireless device via said satellite modem.

6. The system of claim 1, wherein said first wireless device wirelessly transmits a status request to said second wireless device.

7. A wireless sensor interface device at an asset location, comprising:
   a first wireless device that interfaces with a satellite modem for delivery of sensor data to a remote location, said first wireless device being configured to communicate wirelessly with a second wireless device to receive data generated by a sensor that is coupled to said second wireless device, wherein said communication occurs at a scheduled time at which said first wireless device and said second wireless device both wake from a low power state.

8. The device of claim 7, further comprising a locating device that is coupled to said satellite modem, said locating device generating information that is used to identify a location of the asset.

9. The device of claim 8, wherein said locating device generates location information that is used, at said remote location, to calculate a location of the asset.

10. The device of claim 7, wherein said first wireless device is integrated in hardware with said satellite modem.

11. The device of claim 7, wherein said first wireless device is on separate hardware from said satellite modem, and communicates with said satellite modem using a hardwired interface.

12. The device of claim 7, wherein said first wireless device is configured as a master device and said second wireless device is configured as a slave device.

13. The device of claim 12, wherein said first wireless device assigns a communication channel and wakeup time to said slaved device after said slave device completes a synchronization process.

14. The device of claim 7, wherein said first wireless device transmits configuration information to said second wireless device.

15. The device of claim 14, wherein said configuration information originates at a remote location and is received by said first wireless device via said satellite modem.

16. The device of claim 7, wherein said first wireless device transmits a status request to said second wireless device.

17. A wireless sensor monitoring method, comprising:
   determining, by a first wireless device, a scheduled time during which a second wireless device is expected to be awake;
   entering, by said first wireless device, into a low power state; and
   at said scheduled time, waking said first wireless device and wirelessly transmitting a report of a sensor event to said second wireless device.

18. The method of claim 17, further comprising receiving, by said first wireless device, a message from said second wireless device prior to said wirelessly transmitting.

19. The method of claim 17, wherein said wirelessly transmitting is on an assigned communication channel.

20. The method of claim 17, further comprising receiving, by said first wireless device an acknowledgment from said second wireless device.

* * * * *